May 19, 1931.  G. STRUNK  1,806,129
DEVICE FOR CHANGING OVER THE POINTS IN MINE
TRACKS FROM THE TRAVELING VEHICLE
Filed July 14, 1930

Inventor:

Gustav Strunk

Patented May 19, 1931

1,806,129

UNITED STATES PATENT OFFICE

GUSTAV STRUNK, OF ESSEN-RUHR, GERMANY

DEVICE FOR CHANGING OVER THE POINTS IN MINE TRACKS FROM THE TRAVELING VEHICLE

Application filed July 14, 1930, Serial No. 467,737, and in Germany June 6, 1929.

Invention concerns a device for changing over the points in mine tracks by means of compressed air from the traveling vehicle. The known devices of this kind use rail valves which are actuated by the vehicle passing over them. The disadvantage of these valves is that they easily get choked up with dirt and also can be trodden down by mistake by a pedestrian. If this occurs while a train is passing over the points then trucks can thereby be derailed or break away. In addition, by a valve of the kind in question, the points cannot be changed over from the vehicle otherwise than into the normal direction of travel.

The invention seeks to obviate these defects by fitting the actuating valve to the hanging wall of the lode and causing the release lever of the valve to project into the "profile" of the vehicle.

Figure 1:
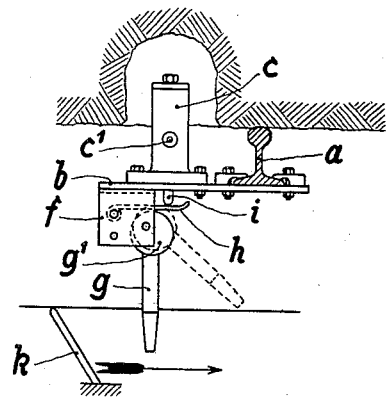
Figure 2:
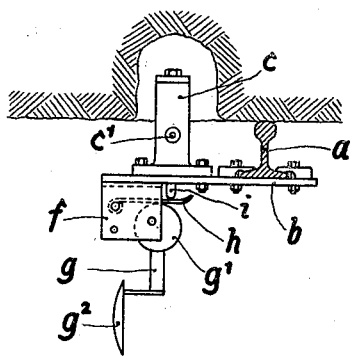

On the drawings two constructional examples of the invention are shown,

Figs. 1 and 2 showing a side elevation of the two constructional examples, and

Figure 3:
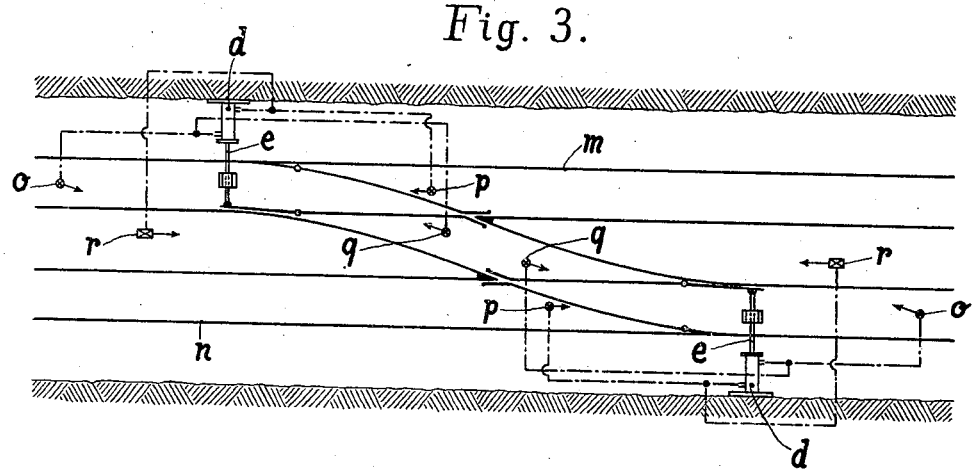

Fig. 3 in diagram the fitting of the valve according to Figs. 1 and 2 to the points.

To a cap rail $a$ a carrier plate $b$ is fixed on which the valve $c$ is mounted. To the connection $c^1$ of the valve the duct—indicated by dot and dash lines—is connected up which runs to the pneumatic cylinder (Fig. 3) the piston rod $e$ of which is connected to the points. To the plate $b$ cheeks $f$ are fixed between which the releasing lever $g$ is mounted so as to rock which lever acts by an eccentric $g^1$ through the medium of the lever $h$ on the piston rod $i$ of the valve $c$. The releasing lever $g$ of the valve according to Fig. 1 projects into the path of the plough $k$ of an electric locomotive; its lower part consists of insulating material.

The releasing lever $g$ of the valve according to Fig. 2 carries a slightly curved disc $g^2$ which can be struck by hand by the engine driver and for this purpose projects into the profile of the vehicle without coming into contact with the plough arm $k$. For the rest, the valve is of the same construction as that described above.

The mode of operation of the device described is as follows:

The normal direction of travel of the locomotive is shown in Fig. 1 by an arrow. If, in this direction, the plough $k$ strikes against the releasing lever $g$ then it carries it along into its position shown in dash lines; in this process the eccentric $g^1$ through the medium of the lever $h$ lifts the piston rod $i$ of the valve so that the points are changed over if they are not in the right position. If on the other hand the plough arm strikes the releasing lever $g$ in the reverse direction of travel, then the latter swings away to the opposite side without actuating the valve.

In the illustration according to Fig. 3 it is assumed that normally every train passing over the track $m$ from left to right or the track $n$ from right to left, is to be switched over to the other track. In the valves $o$, $p$, $q$ and $r$ arrows indicate the direction of travel in which they are actuated, while they remain unaffected in the opposite direction. The valves $o$, $p$ and $q$ are valves according to Fig. 1 but the valve $r$ is of the kind shown in Fig. 2. If, then, a train is exceptionally to remain on the same track in the direction of travel mentioned, then the valve $r$ is actuated by hand.

I claim:—

1. In a device for changing over pneumatically controlled pit track points in mine tracks from the traveling vehicle, a hanging wall of a lode; an actuating valve provided on the hanging wall; and a releasing lever for said actuating valve, hanging down so that it can be struck by the vehicle in the direction of travel.

2. In a device for changing over pneumatically controlled pit track points in mine tracks from the traveling vehicle, a hanging wall of a lode; an actuating valve provided on the hanging wall; and a releasing lever for said actuating valve, hanging down so that it can be struck from the vehicle by hand in the direction of travel.

3. In a device for changing over pneumatically controlled pit track points from the traveling vehicle, in combiation: a hanging wall, an actuating valve provided on the hanging wall; a releasing lever for said actuating valve, hanging down so that it can be struck by the vehicle in the direction of travel; a second actuating valve provided on the hanging wall; and a releasing lever for said second valve, hanging down so that it can be struck from the vehicle by hand in the direction of travel.

4. In a device for changing over pneumatically controlled pit track points from the traveling vehicle, a hanging wall; an actuating valve provided on the hanging wall and a releasing lever for said actuating valve, hanging down so that it can be struck in the direction of travel; said releasing lever being mounted so that it can rock and provided with an eccentric which when the lever swings out in one direction opens the valve, but leaves it unaffected in the other direction.

5. In a device for changing over pneumatically controlled pit track points from the traveling vehicle, a hanging wall; an actuating valve, provided on the hanging wall and a releasing lever for said actuating valve, hanging down so that it can be struck in the direction of travel; said releasing lever being mounted so that it can rock and provided with a cam which when the lever swings out in one direction opens the valve, but leaves it unaffected in the other direction.

6. In a device for changing over pneumatically controlled pit track points from the traveling vehicle, a hanging wall; an actuating valve provided on the hanging wall; a duct connecting said valve with one end of the pneumatic cylinder; a releasing lever for said actuating valve hanging down so as to project into the profile of the vehicle and switching over the points into a position corresponding to the normal direction of travel; a second actuating valve arranged within reach adjoining the profile and adapted to be struck by hand and a duct connecting said second valve with the other end of the pneumatic cylinder so as to switch over the points into a position deviating from the normal direction of travel.

In testimony whereof I have hereunto set my hand.

GUSTAV STRUNK.